United States Patent
Balatchev et al.

(10) Patent No.: US 11,879,811 B2
(45) Date of Patent: Jan. 23, 2024

(54) SENSORS FOR DETECTING PRESENCE OF FLUIDS

(71) Applicant: Valbatech Inc., Ontario (CA)

(72) Inventors: Stefan Balatchev, Ottawa (CA); Sacha Dabetic, Maurepas (FR)

(73) Assignee: Valbatech Inc., Ottawa (CA)

( * ) Notice: Subject to any disclaimer, the term of this patent is extended or adjusted under 35 U.S.C. 154(b) by 330 days.

(21) Appl. No.: 17/437,327

(22) PCT Filed: Mar. 6, 2020

(86) PCT No.: PCT/CA2020/050301
§ 371 (c)(1),
(2) Date: Sep. 8, 2021

(87) PCT Pub. No.: WO2020/181366
PCT Pub. Date: Sep. 17, 2020

(65) Prior Publication Data
US 2022/0178783 A1    Jun. 9, 2022

(30) Foreign Application Priority Data
Mar. 8, 2019    (GB) ..................... 1903126

(51) Int. Cl.
*G01M 3/04*    (2006.01)

(52) U.S. Cl.
CPC .................. *G01M 3/045* (2013.01)

(58) Field of Classification Search
CPC .................. G01M 3/045; G01M 3/18
USPC ......................................... 324/696
See application file for complete search history.

(56) References Cited

U.S. PATENT DOCUMENTS

2018/0172535 A1*  6/2018  Harsh ............. G01K 13/02

* cited by examiner

*Primary Examiner* — Farhana A Hoque
(74) *Attorney, Agent, or Firm* — Teitelbaum & Bouevitch; Neil Teitelbaum

(57) ABSTRACT

An elongated sensor for detecting the presence of a particular fluid includes first and second conductors, both extending from the proximal end to the distal end of the sensor. The second conductor includes a swellable conductor, at least a portion of the swellable conductor is swollen when in contact with the fluid and its conductance at least 10 times less when the portion is in contact with the fluid than when absent contact with the fluid. The second conductor further includes a subsidiary conductor in direct contact with the swellable conductor. In one embodiment the first conductor is isolated from the second conductor in the inner part of the sensor, and the two conductors are electrically connected at the distal end of the sensor. In another embodiment, the first contactor is in direct contact with the subsidiary conductor within the inner part of the sensor.

17 Claims, 12 Drawing Sheets

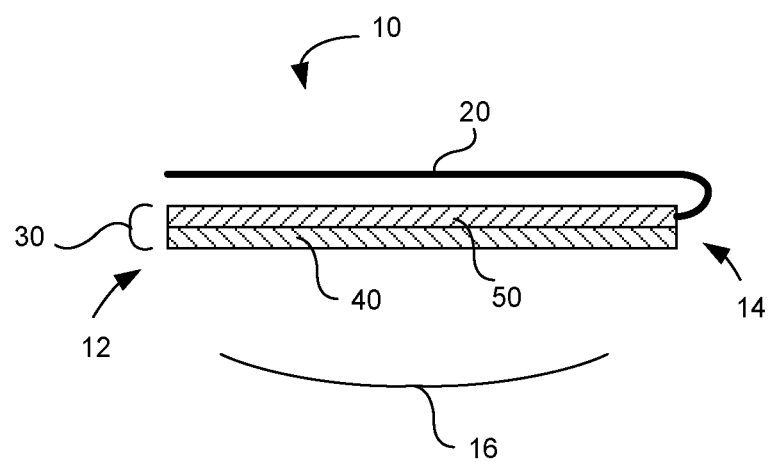
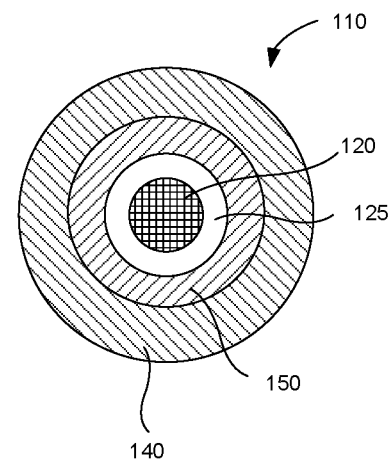
FIG. 1
FIG. 2
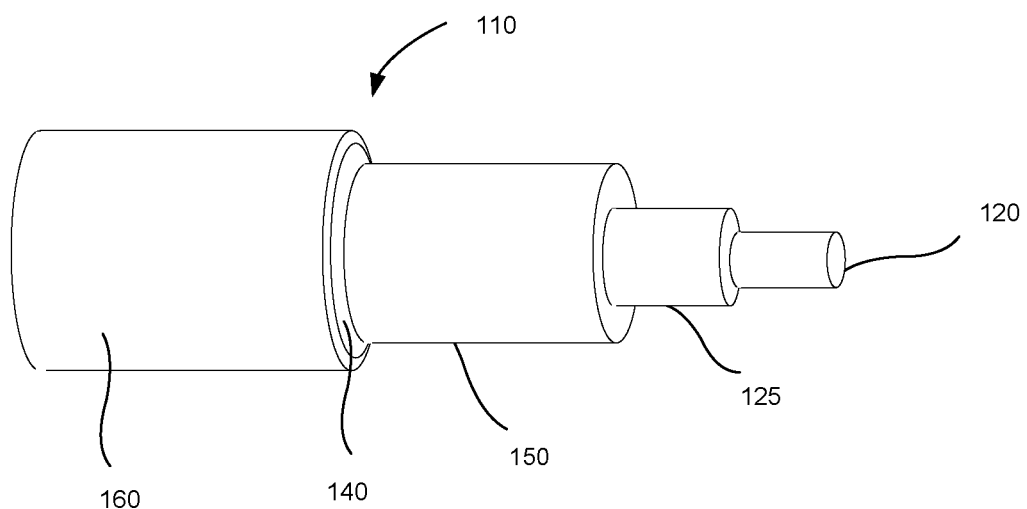
FIG. 3

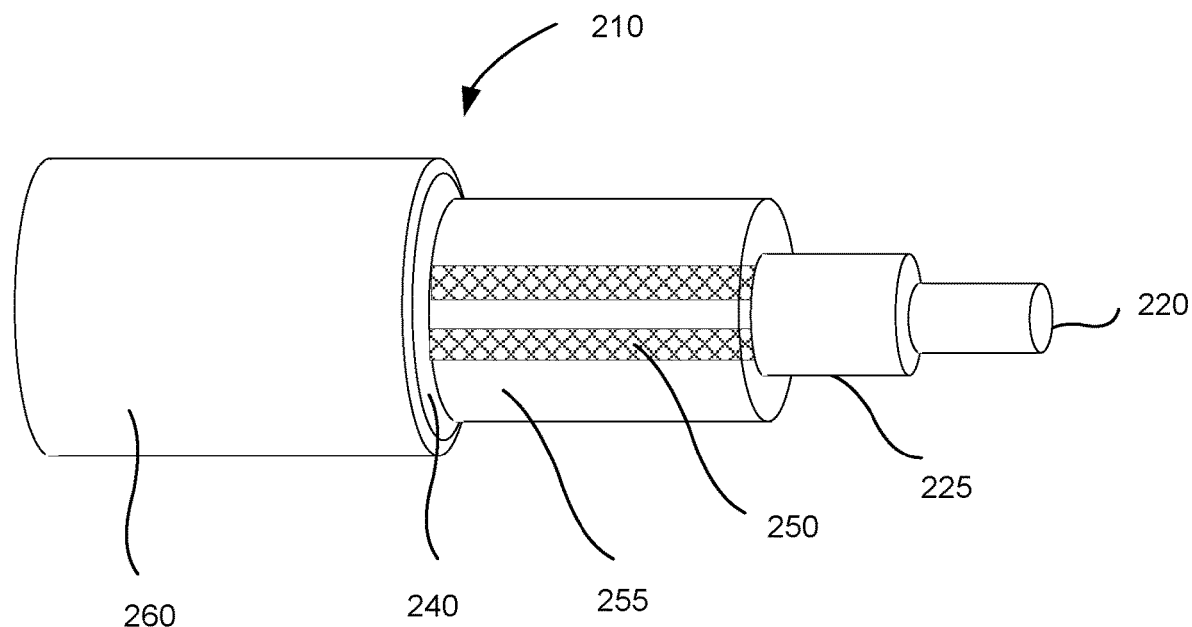
FIG. 4
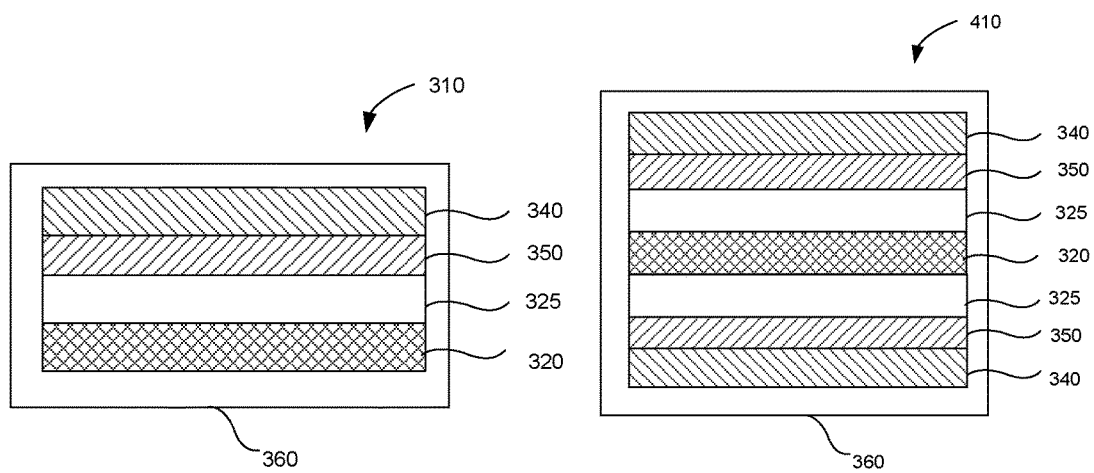
FIG. 5
FIG. 5A

SENSORS FOR DETECTING PRESENCE OF FLUIDS

RELATED APPLICATION DATA

This application is the national stage entry of International Appl. No. PCT/CA2020/050301, filed Mar. 6, 2020, which claims priority to Great Britain Patent Application No. 1903126.9 filed Mar. 8, 2019. All claims of priority to that application are hereby made, and that application is hereby incorporated in its entirety by reference.

TECHNICAL FIELD

The disclosure relates to the field of electrical sensors and, more particularly, to sensors including swellable materials.

BACKGROUND OF THE INVENTION

The disclosure relates to discovering and locating leakages of petroleum products or other fluids, such as organic or inorganic solvents, alcohols, acids or bases. Some of detectors used for this purpose include swellable materials, which noticeably swell on absorbing a particular fluid. When the liquid or vapor to be detected contacts the swellable material, it swells due to absorption of the fluid. The swollen structural element may press together or, to the contrary, separate other elements of an electrical sensor resulting in a detectable event. The swellable material may be conductive, and the conductivity may noticeably change when the material is swollen.

U.S. Pat. No. 3,970,863 provides an elongated detecting element for leaks of petroleum products. The sensor includes a copolymer which swells or dissolves on contact with petroleum products. Accordingly, the sensor loses its conductivity. However, a leakage cannot be discriminated from a physical break of the sensor.

U.S. Pat. No. 5,341,128 describes an elongated element composed of an insulated conductor covered with a swellable element. Additional detection wires may be used for sensing the presence or absence of electric current in the swellable portion. While capable of detecting the presence of hydrocarbons, such sensor does not allow for discriminating between a sensor break and a leakage alarm. U.S. Pat. No. 9,513,185 is an improvement of the sensor described in U.S. Pat. No. 5,341,128 as it allows the discrimination of breaks and leak alarms by introducing a third conductor. However, such structure is more complex and needs the use of a specialized three-terminal management module.

U.S. Pat. No. 4,926,165 teaches a device with two elongated conductors helically wrapped around a support core. A swellable, conductive polymer member surrounds the conductors. In the presence of a fluid, the swellable material remains conductive and, by swelling, forms a conductive bridge between the two elongated conductors.

While a variety of sensors are available on the market, there is still a need for further improvement.

SUMMARY OF THE INVENTION

The instant disclosure provides an elongated sensor having a proximal end and a distal end, and an inner portion therebetween, for detecting the presence of a fluid, the sensor comprising: a first conductor extending from the proximal end to the distal end of the sensor; and, a second conductor extending from the proximal end to the distal end of the sensor, isolated from the first conductor in the inner portion of the sensor, comprising: a swellable conductor, wherein at least a portion of the swellable conductor is swollen when the portion is in contact with the fluid and the electrical conductance of the portion is at least 10 times less when the portion is in contact with the fluid than when absent contact with the fluid, and a subsidiary conductor is in direct contact with the swellable conductor in the inner portion of the sensor and in electrical contact with the first conductor at the distal end of the sensor.

The disclosure also provides an elongated sensor having a proximal end and a distal end, and an inner portion therebetween, for detecting the presence of a fluid, the sensor comprising: a first conductor extending from the proximal end to the distal end of the sensor; and,
a second conductor extending from the proximal end to the distal end of the sensor, comprising: a swellable conductor, wherein at least a portion of the swellable conductor is swollen when the portion is in contact with the fluid and the electrical conductance of the portion is at least 10 times less when the portion is in contact with the fluid than when absent contact with the fluid, and a subsidiary conductor in direct contact with the first conductor and the swellable conductor in the inner portion of the sensor.

One aspect of the disclosure relates to a sensor cable comprising an elongated sensor and a termination resistor connected in parallel to a swellable conductor of the elongated through an insulated conductor which is an integral part of the sensor. Optionally, the outer surface of the sensor is covered with an elastic non-conductive overcoat permeable for the target liquid but impervious to the water and other fluids that shall not be detected.

Another aspect of the disclosure relates to a sensor cable comprising a multiplexer, a shared conductor, and a plurality of sensor cables, in which each of the plurality of sensor cables has a first terminal and a second terminal, the first terminals are connected to the shared conductor, the second terminals each connected to an individual conductor, and the individual conductors are multiplexed at the multiplexer.

The disclosure further provides a sensor cable for detecting the presence of a fluid, comprising: an elongated swellable conductor, wherein at least a portion of the swellable conductor is swollen when the portion is in contact with the fluid and the electrical conductance of the portion is at least 10 times less when the portion is in contact with the fluid than when absent contact with the fluid; and a termination resistor connected in parallel to the elongated sensor.

There is also provided a sensor cable comprising a multiplexer, a shared conductor, and a plurality of sensor cables. Each of the plurality of sensor cables has a first terminal and a second terminal, the first terminals connected to the shared conductor, the second terminals each connected to an individual conductor, and the individual conductors are multiplexed at the multiplexer.

One aspect of the disclosure relates to an elongated sensor having a proximal end and a distal end, and an inner portion therebetween, for detecting the presence of a fluid, the sensor comprising a hybrid swellable conductor. comprising a swellable conductor, wherein at least a portion of the swellable conductor is swollen when the portion is in contact with the fluid and the electrical conductance of the portion is at least 10 times less when the portion is in contact with the fluid than when absent contact with the fluid. The hybrid conductor further comprises a subsidiary conductor in direct contact with the swellable conductor in the inner part of the sensor. A ratio of the conductance of the subsidiary conductor to the conductance of the swellable conductor when absent contact with the fluid is in the range of 0.0000001 to 1000.

BRIEF DESCRIPTION OF THE DRAWINGS

Exemplary embodiments will now be described in conjunction with the drawings in which:

FIG. 1 is a schematic representation of a sensor including a hybrid conductor.

FIG. 2 is a cross-section of an embodiment of the sensor illustrated in FIG. 1.

FIG. 3 is a schematic representation of an embodiment of the sensor illustrated in FIG. 1.

FIG. 4 is a schematic representation of an embodiment of the sensor illustrated in FIG. 1.

FIG. 5 is a cross-section of an embodiment of the sensor illustrated in FIG. 1.

FIG. 5A is a cross-section of an embodiment of the sensor illustrated in FIG. 1.

DETAILED DESCRIPTION OF THE INVENTION

Figure 6:
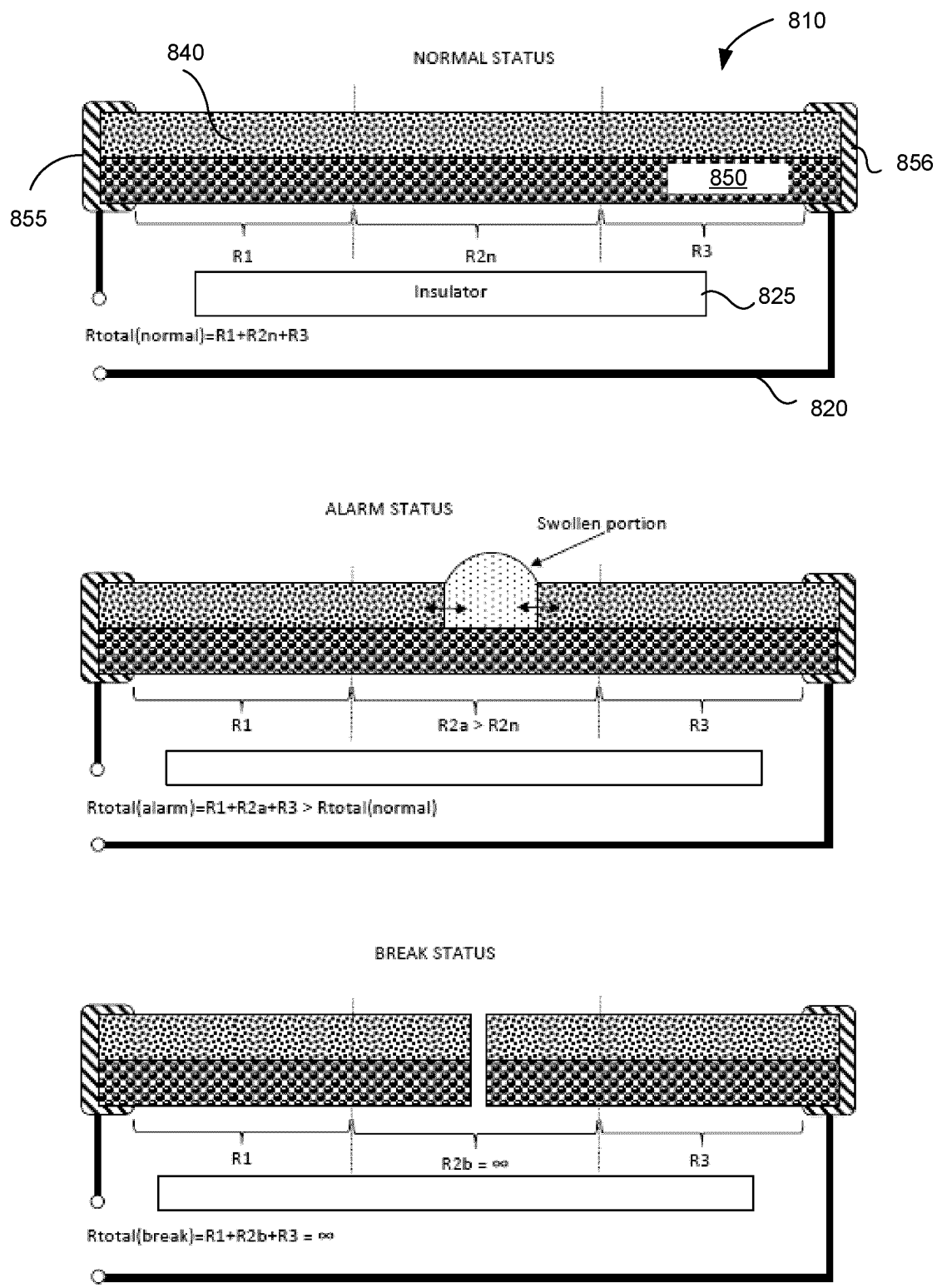
FIG. 6 illustrates equivalent schematics for normal and abnormal operation of the sensor illustrated in FIG. 1.

Some of conventional sensors for detection fluids, such as liquids or vapors, include a conductor formed of a swellable material with conductive particles dispersed therein. On contact with a fluid to be detected, the material swells so that the conductive particles separate from each other making the material non-conductive. Accordingly, an electric circuit formed by the sensor and power supply is broken. However, the interruption of the electric current caused by a leakage cannot be discriminated from e.g. a physical snap of the sensor.

The instant disclosure relates to a hybrid swellable conductor, also referred herein as a composite conductor, formed of a swellable conductor and a subsidiary conductor, connected in parallel and in permanent direct electric contact with one another along most of their length. The swellable conductor includes a swellable non-conductive or barely conductive material with a conductive admixture dispersed therein.

On contact with the fluid to be detected, the swellable conductor expands and the swollen material may lose its electrical conductivity or the conductivity becomes very low. However, the subsidiary conductor remains conductive and enables electric current through the sensor, including non-swollen and still conductive portion(s) of the swellable conductor. Preferably, a conductance of the subsidiary conductor is less than that of the swellable layer in its non-swollen state. When a portion of the swellable layer is swollen, the subsidiary conductor diverts part of the electric current to non-swollen portion(s) of the swellable layer. The relative increase of the resistance is less than that with a simple sensor with only a swellable layer and absent a subsidiary conductor indirect contact with the swellable layer along the sensor. A sensor with the hybrid conductor as disclosed herein may provide the same degree of sensitivity as a conventional sensor having the same swellable conductor without a subsidiary conductor. However, when a sensor is in contact with the liquid of interest, no electric current may be detected in a sensor without a subsidiary conductor, while a sensor with the composite conductor still has an electric current through the sensor, indicating that the sensor is intact and operational.

Furthermore, the composite conductor makes it possible to determine the location of a leakage. The subsidiary conductor and non-swollen portion(s) of the swellable conductor form a resistor network, and its resistance depends on the location of the leak. Therefore, the location may be determined based on resistance measurement(s).

Moreover, using the composite conductors allows for adjusting an alarm level, wherein an alarm may be configured so as to exclude small leaks and low changes in resistance of the sensor.

This disclosure provides a variety of sensors using the composite conductor for detecting a leakage and simultaneously indicating that the sensor is operational, and/or for detecting the location of the leak. Each sensor is designed for detecting one or more particular fluids, e.g. hydrocarbon liquids and vapors, gasoline, water, synthetic solvents, solvents extracted from natural products, turpentine, limonene, alcohols, acids or bases. Materials for the composite conductor are chosen on consideration of their interaction with the particular fluid(s).

With reference to FIG. 1, an elongated sensor 10 for detecting the physical presence of a particular fluid has a proximal end 12, a distal end 14, and an inner portion 16 therebetween. The sensor 10 includes a first conductor 20 extending from the proximal end 12 to the distal end 14. The first conductor 20 may be formed of one or more conductive metals or alloys, such as copper, silver, gold, aluminum, iron, nickel, cobalt, or any combination or alloys including other metals. The first conductor 20 is substantially inert, i.e. it does not swell and its conductivity does not change dependent on the presence of the fluid to be detected.

The sensor 10 also includes a second conductor 30 extending from the proximal end 12 of the sensor to the distal end 14. The second conductor 30 is a composite conductor as discussed above.

The second conductor 30 includes a swellable conductor 40. It swells when absorbing the fluid; a swollen portion loses its conductivity or the conductivity becomes significantly reduced. For certainty, the specific conductivity in a swollen portion drops at least 10 times in comparison with the non-swollen state, i.e. when absent contact with the fluid.

In other words, the electrical conductance of the portion is at least 10 times less when the portion in contact with the fluid than when absent contact with the fluid. More preferably, the electrical conductance of the portion is at least 20 times less than when absent contact with the fluid.

The swellable conductor may be formed of one or more swellable materials with conductive admixture dispersed therein. When a portion of the swellable conductor absorbs the fluid, at least a portion of the swellable conductor swells, and the conductive particles start to separate or distance from each other. Accordingly, the electrical resistance of that portion increases at least 10 times and, preferably, at least 20 times. The swollen portion may completely lose its conductivity.

A suitable swellable material may be a polymer, an elastomer, or a mixture thereof. The list of suitable materials includes a natural or synthetic rubber, silicone, a thermoplastic elastomer, a styrenic polymer or elastomer, and vinyl polymer or elastomer. The conductive admixture may include carbon or metal powder, carbon or metal fibres, and/or nanotubes. Other materials and admixtures may be used if the conductance of the resulting swellable conductor significantly drops when a portion of the conductor absorbs the fluid. The swellable materials may also be mixed with non-swellable materials, in order to adjust the rate of swelling and/or to improve the mechanical or chemical properties of the swellable conductor.

It is desirable for the sensor 10 be reusable after a duration time, e.g. after the swellable conductor is rinsed and/or dried to remove the fluid.

The second conductor 30 further includes a subsidiary conductor 50, not sensitive or barely sensitive to the presence of the target fluids to be detected. Preferably, the subsidiary conductor 50 is substantially inert, i.e. it does not swell on contact with the fluid to be detected. However, if the subsidiary conductor 50 is swellable on contact with the fluid to be detected, the swellable conductor 40 is at least 50% more swellable (in terms of volume ratio) than the subsidiary conductor 50, and preferably—at least 100% more swellable. The conductor 50 never completely losses its conductivity when in contact with target fluid.

The subsidiary conductor 50 may include one or more base materials such as a polymer, elastomer or a mixture thereof. The list of suitable materials includes a fluoropolymer, an elastomer, a polyolefin, a polyamide, and a polyimide. Conductive admixture should be added to those materials so as to enable the conductivity of the subsidiary conductor 50. The conductive admixture may include carbon or metal powder, carbon or metal fibers, and/or nanotubes. Though it is not necessary, a same admixture material may be used in the swellable conductor 40 and the subsidiary conductor 50. Thin metal or alloy wires or conductive film deposition on isolated elongate element as well as layers of graphene, carbon nanotubes, etc., are also suitable. The subsidiary conductor 50 may include an insulated elongate element covered with a deposited film of conductive particles such as metal or metal alloy, carbon black, carbon fibres, graphene, or nanotubes of carbon; the film may be also coated onto the first conductor 20 covered with an isolator.

In one embodiment, the subsidiary conductor 50 includes an intrinsically conducting polymer, such as polyacetylene, polyaniline, polypyrrole, etc. In another embodiment, the subsidiary conductor 50 is made of carbon fibers, as a bundle, a tow or a yarn. The subsidiary conductor 50 may be a thin metal film, e.g. with a thickness in the range from 10 nm to 10 μm deposited on, and covering fully or partially a non-conductive support, e.g. the isolating layer over the first conductor 20.

Depending on the application, some materials can be used as swellable for one group of fluids and as non-swellable for another group of target fluids. For instance, silicone elastomers can be used as swellable material for hydrocarbons and as non-swellable for alcohols. In other words, the materials used in the sensor predefine one or more fluids which may be detected using the sensor.

The subsidiary conductor 50 provides a relatively weak electrical connection between the swellable conductor 40 and the first conductor 20. Preferably, the electrical conductance of the subsidiary conductor 50 is at least 10 times lower than the conductance of the first conductor 20. If the proximal end of the sensor 10 is connected to a power supply, the first conductor 20 loops the electric circuit and returns electric current to the proximal end of the sensor. Consequently, using a highly conductive first conductor reduces losses and heating of the sensor. However, the first conductor 20 may be formed of the materials suitable for the subsidiary conductor 50, and the sensor may be arranged as a loop.

The conductance of the subsidiary conductor 50 should be comparable with the conductance of the swellable conductor 40 when it is not swollen. Otherwise, e.g. if a highly conductive copper wire were used instead of the subsidiary conductor described herein, the impact of the swellable conductor 40 would be negligible, and the device would essentially lose its leakage detector capability. The conductance of the subsidiary conductor 50 is in the range of 0.0000001 to 1000 times of the electrical conductance of the swellable conductor 40 in its non-swollen state, and more preferably in the range of 0.000001 to 10 times.

The first conductor 20 is electrically isolated from the second conductor 30 at least in the inner portion 16 of the sensor 10. The constituents of the second conductor 30, the swellable conductor 40 and the subsidiary conductor 50, are in direct and permanent contact with one another, at least in the inner portion 16 of the sensor 10.

At the distal end 14 of the sensor 10, the first conductor 20 is in electrical contact with the subsidiary conductor 50. A coupler may be used at the distal end 14 for electric coupling of the first conductor 20 and the subsidiary conductor 50, and optionally the swellable conductor 40. Alternatively, the subsidiary conductor 50 and the first conductor 20 may be bound together at the end 14, e.g. spliced, or one may be coated onto another, or they may be integral and formed of a same material, though the two conductors are electrically isolated from one another everywhere but the distal end of the sensor.

At the proximal end 12, a first connector may be connected to the first conductor 20, and a second connector may be connected to the subsidiary conductor 50. The second connector may also be connected to the swellable conductor 40, or to both conductors 40 and 50. The first and second connectors are for coupling the sensor to a resistance measurement device.

The swellable conductor 40 may cover only a portion of the subsidiary conductor 50, in particular, missing the proximal and/or distal end of the subsidiary conductor 50 and, thus, not connected to the coupler at the distal end of the sensor and the second connector at the proximal end of the sensor.

Optionally, the sensor 10 includes an insulative jacket permeable to the fluid.

With reference to FIGS. 2 and 3, a sensor 110 is an embodiment of the sensor 10. The first conductor may be a metal wire 120. An isolative jacket 125 at least partially covers the first conductor 120 for electrically isolating the first conductor 120 from the second conductor in the inner portion 16 of the sensor.

The second conductor may include a subsidiary conductive jacket 150 at least partially covering the isolative jacket 125. A swellable conductive jacket 140 at least partially covers the subsidiary jacket 150 and isolative jacket 125. Preferably, the swellable jacket 140 is at least 50% more swellable than the subsidiary jacket 150, and more preferably—at least 100% more swellable. Optionally, the sensor 110 includes an insulative jacket 160 permeable to the target fluid; the jacket 160 is shown in FIG. 3 but not in FIG. 2.

Preferably, in the inner portion of the sensor, the jackets 125, 140 and 150 completely cover one another. However, any of the jackets may cover underlying layers only partially. For example, the swellable jacket 140 and the subsidiary jacket 150, each may be arranged in the form of one or more longitudinal stripes, one jacket over another, along the isolated wire 120&125, between the proximal and distal ends of the sensor.

With reference to FIG. 1, the first conductor 20 may be a wire in the harness of the second conductor 30, or a conductive stripe on the surface of the second conductor 30, isolated therefrom. The cross section of the sensor is not necessarily round; it may be flat, oval, square, etc. Other configurations are, of course possible.

The purpose of these structures is to leave the sensitive swellable material exposed to the target fluid while maintaining the conductivity of the sensor element, albeit decreased. When the conductive sensitive material contacts the fluid of interest, the material begins to absorb the fluid and swells, thereby losing its conductivity, at least partially. From the point of view of the user, the electrical resistance of the sensor will increase to a finite and measurable value, and this increase will be a function of the length of the detector element in direct contact with the fluid. In case of presence of fluid in contact with the detector element, the conductivity of the latter will not be lost completely. In the event of a break of the subsidiary conductive jacket 150 or its support (the insulated electrical wire 120&125), the conductivity between the two terminals will be lost completely and the measurement device will indicate an open circuit.

With reference to FIG. 4, a sensor 210 is an embodiment of the sensor 10. The first conductor is a metal wire 220 with an isolative jacket 225 at least partially covering the first conductor 220 for electrically isolating the first conductor from the second conductor in the inner portion of the sensor. The second conductor includes a subsidiary conductive jacket 250 in the form of longitudinal stripes partially covering the isolative jacket 225. A swellable conductive jacket 240 at least partially covers the subsidiary jacket 250 and isolative jacket 225. Optionally, the sensor 210 includes an insulative jacket 260 permeable to the fluid. Portions of the sensor 210 between the stripes 250 may be filled with the material of the swellable conductive jacket 240; in other words, the swellable conductive jacket 240 may be in direct contact with portions of the isolative jacket 225 not covered by the subsidiary conductive jacket 250. Preferably, the swellable jacket 240 is at least 50% more swellable than the subsidiary jacket 250, and more preferably—at least 100% more swellable.

In one embodiment, the first and second conductors are planar, as well as an isolator therebetween. FIGS. 5 and 5A illustrate cross-sections of sensors 310 and 410 which are embodiments of the sensor 10. The sensors include planar first conductor 320, isolators 325, subsidiary conductors 350, swellable conductors 340, and optional elastic insulative jacket 360 permeable to the target fluid.

Preferably, the isolators between the first and second conductors, such as the isolators 125 (FIGS. 2 and 5), 225 (FIG. 4), 325 (FIGS. 5 and 5A), and 825 (FIG. 6) are non-swellable. The first conductor together with the isolator may form a conventional isolated wire.

With reference to FIG. 6, a sensor 810 is an embodiment of the sensor 10. The sensor 810 includes a first conductor 820, an isolator 825, a subsidiary conductor 850, a swellable conductor 840, an optional insulative jackets (not shown) permeable to the target fluid, and couplers 855 and 856, at the proximal and distal ends of the sensor, respectively. At the distal end, the coupler 856 couples the second conductor, formed of the swellable conductor 840 and the subsidiary conductor 850, with the first conductor 820.

FIG. 6 provides equivalent schematics for normal and abnormal operation of the sensor 10 illustrated by the sensor 810. R1 and R3 are resistance values for portions of the sensor 810 not affected by the fluid. R2$a$ is an abnormal resistance of the sensor part in contact with the fluid, shown in the drawing as a central part of the sensor. In normal operation, that portion has resistance R2$n$, which is less than the abnormal resistance R2$a$. The total resistance of the sensor when no fluid is present is R(total, normal)=R1+R2$n$+R3. The total resistance of the sensor when in contact with the fluid is R(total, alarm)=R1+R2$a$+R3, which is greater than R(total, normal), though a finite value. In case the sensor is physically broken, its resistance is infinitively high.

Advantageously, the sensor 10 allows for discriminating between a cable break and the presence of a leak, and also indicative of the size of a swollen part.

Figure 7:
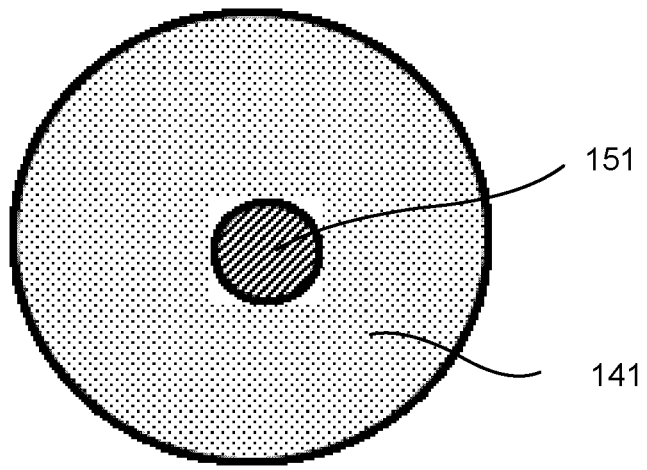
FIG. 7 is a cross-section of a hybrid conductor.

With reference to FIGS. 1 and 7, the composite conductor 30 may be formed of a carbon fiber tow 151 at least partially coated with a swellable material 140 such as described for the swellable conductor 40. FIG. 7 represents a simple and easy to manufacture layout of the sensor 10 where the subsidiary and preferably non-swellable conductor is made of readily available carbon fiber tow. The composite conductor illustrated in FIG. 7 may be joined to an isolated return wire, not shown in FIG. 7, making the design illustrated in FIG. 1, so that the composite conductor and the return wire may be connected to a measuring device at the proximal end of the sensor (left in the drawing). Alternatively, a sensor may constitute the composite conductor (FIG. 7), an optional insulative jacket permeable to the fluid, and no return wire. In operation, the two ends of the composite conductor may be connected to a measuring device. The carbon fiber tow may also be placed in parallel to an insulated conductor to obtain a conductive stripe as presented in FIG. 4.

Figure 8:
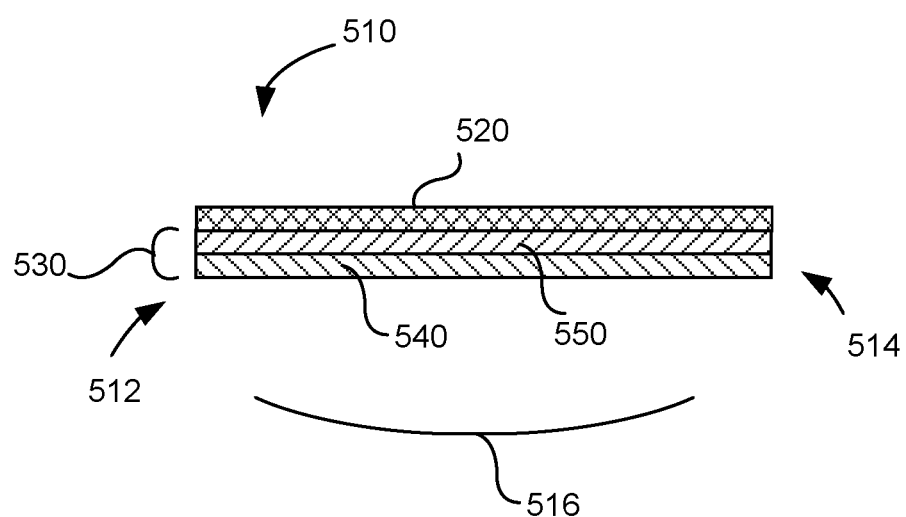
FIG. 8 is a schematic representation of a sensor including a composite conductor.

With reference to FIG. 8, an elongated sensor 510 for detecting the presence of a particular fluid has a proximal end 512, a distal end 514, and an inner portion 516 therebetween. The sensor 510 includes a first conductor 520 extending from the proximal end 512 to the distal end 514 of the sensor. The first conductor 520 may be formed of the same conductive metals and/or alloys, as the conductor 20 (FIG. 1).

The sensor 510 further includes a second conductor 530 extending from the proximal end 512 to the distal end 514 of the sensor. The second conductor 530 is a composite conductor. It is formed of a swellable conductor 540 and a subsidiary conductor 550, which operate the same way and may be formed of the same materials as the conductors 40 and 50 (FIG. 1), respectively.

The swellable conductor 540 swells and is at least 10 times less conductive when infiltrated with the fluid than when absent contact with the fluid. More preferably, the specific conductivity in a swollen portion of the swellable conductor is at least 20 times less than when absent contact with the fluid. The subsidiary conductor 550 is in permanent direct contact with the first conductor 520 and swellable conductor 540 in the inner portion 516 of the sensor 510.

Advantageously, the sensor 510 allows for discriminating between a cable break and the physical presence of a leak, and also indicative of the size of a swollen part. Additionally, the sensor 510 allows identifying the location of a leak, which is an important feature for elongated sensors, especially for buried applications.

It is desirable for the sensor 510 be reusable after a duration time, e.g. after the swellable conductor is rinsed and/or dried to remove the fluid.

In one embodiment of the sensor 510, the first and second conductors are planar, as in the embodiment of the sensor 10 illustrated in FIGS. 5 and 5A, with the exception that the isolators 325 are absent in accordance with the description of the sensor 510 (FIG. 8).

Figure 9:
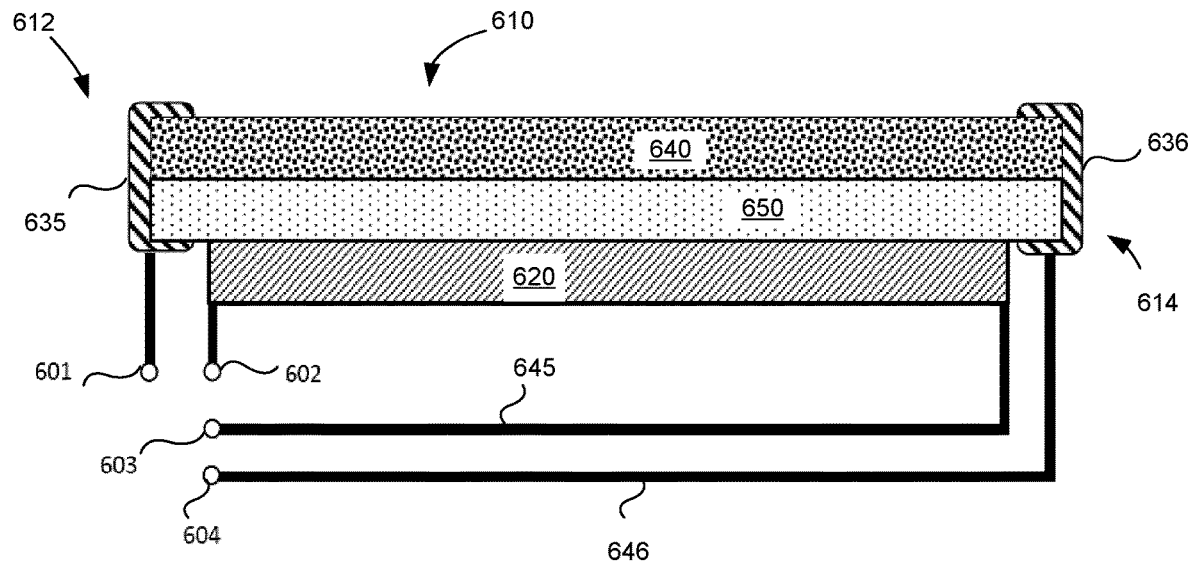
FIG. 9 is a schematic representation of an embodiment of the sensor illustrated in FIG. 8.

The sensor 510 may be connected to a measuring system at the sensor's proximal end, as illustrated in FIG. 9, wherein a sensor 610 is an embodiment of the sensor 510 and is used as an example of the sensor 510. The sensor 610 includes a first terminal 602, which may be a first connector or a wire end wherein the first connector may be attached or integral. The first terminal 602 is connected to a first conductor 620 at a proximal end 612 of the sensor.

The sensor 610 includes a second terminal 601, which may be a second connector or a wire end wherein the second connector may be attached or integral. The second terminal 601 may be connected to a second conductor 640&650 through a coupler 635 at the proximal end 612 of the sensor. The coupler 635 may be integral with the terminal 601.

At the distal end 614 of the sensor, two connectors (not shown) may be attached to the first and second conductors the same way as at the proximal end 612. Instead FIG. 9 shows a return conductor 645 coupled to the first conductor 620 at the distal end 614 of the sensor and extending to the proximal end 612 of the sensor, and another return conductor 646 coupled by the coupler 636 to the second conductor at the distal end 614 of the sensor and extending to the proximal end 612 of the sensor, so that two more terminals 603 and 604 become available at the proximal end 612 of the sensor. The terminals 603 and 604 may be connectors or wire ends wherein connectors may be attached or integral. The return conductor 645 may be an extension of the first conductor 620, though it needs to be isolated from the first and second conductors. Alternatively, the return conductor 645 may be coupled to the first conductor 620 using a coupler, not shown. It is also possible to have the return conductor 645 joined to the first conductor 620 by splicing, etc. The use of the return conductor 645 and the terminal 603 is optional as the electrical resistance of the first conductor 620 is low. Measuring the resistance of first conductor 620 allows the determination of the length of sensor in case of leak as it is not affected by the presence of fluids.

Figure 9A:
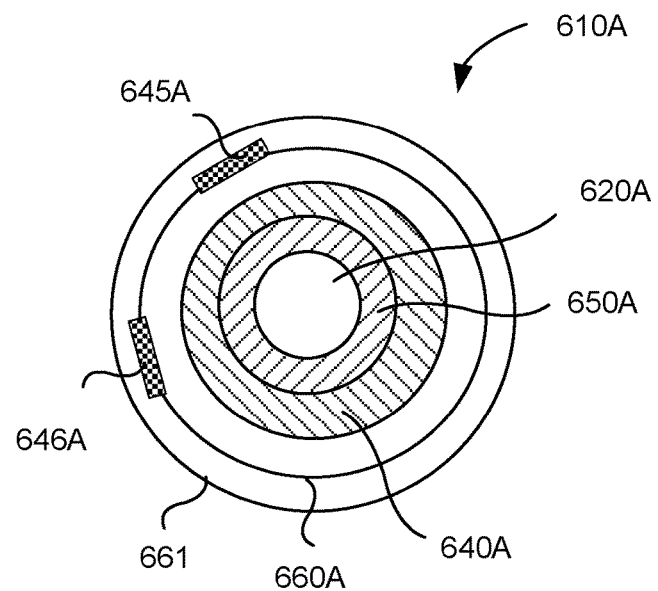
FIG. 9A is a schematic representation of an embodiment of the sensor illustrated in FIG. 9.

Each of the return conductors 645 and 646 may be an isolated wire or a metal stripe on an insulative jacket. With reference to FIG. 9A, a sensor 610A is an embodiment of the sensor 610. The first conductor is a metal wire 620A. The subsidiary conductor forms a subsidiary jacket 650A at least partially covering the first conductor 620A, and the swellable conductor forms a swellable jacket 640A at least partially covering the subsidiary jacket 650A. One or more of return conductors 645A and 646A are stripes on the surface of an insulative jacket 660A, extending from the distal end of the sensor to the proximal end of the sensor, preferably in the longitudinal direction or possibly as spirals, and are covered with an insulative jacket 661. The jackets 660A and 661 are permeable to the target fluid and may be made of a same insulative material.

Figure 10:
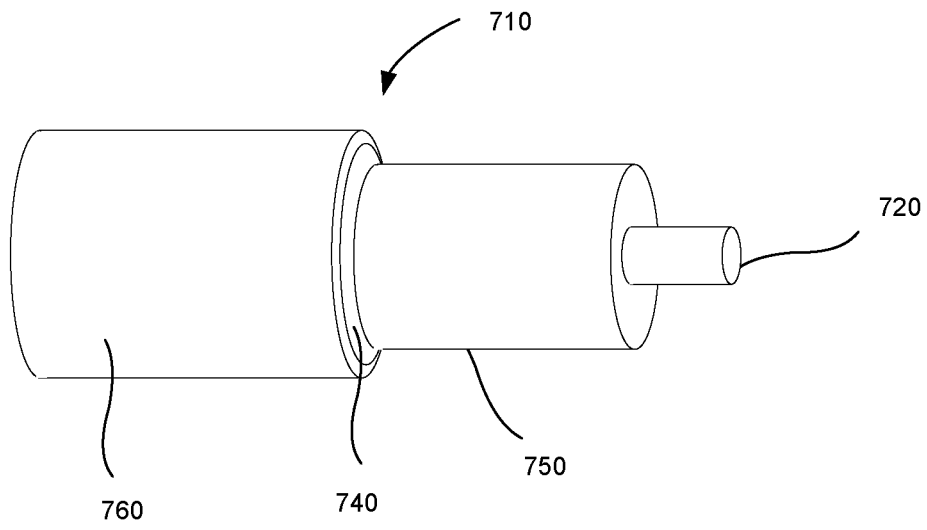
FIG. 10 is a schematic representation of an embodiment of the sensor illustrated in FIG. 8.

With reference to FIG. 10, a sensor 710 is an embodiment of the sensor 510. The first conductor may be a metal wire 720. The subsidiary conductor forms a subsidiary jacket 750 at least partially covering the first conductor 720, and the swellable conductor forms a swellable jacket 740 at least partially covering the subsidiary jacket 750.

Preferably, the swellable jacket 740 is at least 50% more swellable than the subsidiary jacket 750, and more preferably—at least 100% more swellable. Optionally, the sensor 710 includes an insulative jacket 760 permeable to the fluid.

With reference to FIGS. 1 and 8 and a fluid to be detected, the preferable embodiments include the first conductors 20 and 520 made of metals and/or alloys, the swellable conductors 40 and 540—of swellable non-conductive materials with conductive admixture dispersed therein, and the subsidiary conductors 50 and 550—of non-swellable or slightly swellable materials with conductive admixture dispersed therein, or of intrinsically conducting polymers. The subsidiary conductors 50 and 550 are preferably substantially non-swellable. However, if they swell on contact with the fluid, the swellability (a ratio of a volume of a swollen material to its volume in non-swollen state) of the swellable conductors 40 and 540 is preferably at least 50% greater and, more preferably, at least 100% greater than the swellability of the subsidiary conductors 50 and 550. For the swellable conductors 40 and 540, the specific conductivity in a swollen portion drops at least 10 times in comparison with the non-swollen state, and more preferably—at least 20 times. In other words, the electrical conductance of the portion is at least 10 times less when the portion in contact with the fluid than when absent contact with the fluid. More preferably, the electrical conductance of the portion is at least 20 times less than when absent contact with the fluid. Preferably, the electrical conductance of the subsidiary conductors 50 and 550 is at least 10 times lower than the conductance of the first conductors 20 and 520. The conductance of the subsidiary conductors 50 and 550 is preferably in the range of 0.0000001 to 1000 times the conductance of the swellable conductors 40 and 540 in the non-swollen state, and more preferably—in the range of 0.000001 to 10 times. Preferably, the first conductor 20 or 520 serves as a central support wire, while other conductors form jackets at least partially surrounding the first conductor.

With reference to FIGS. 11 through 15, the operation of the sensor 510 is discussed using the sensor 610 as an example.

Figure 11:
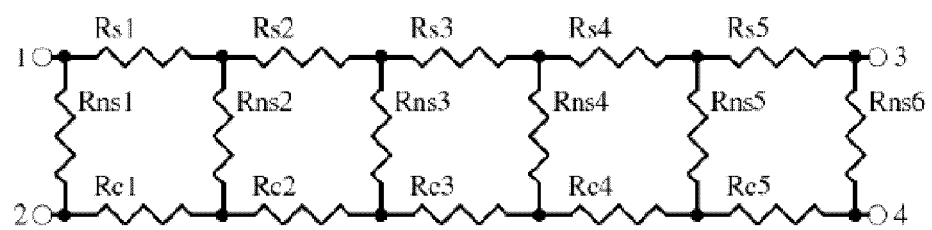
FIG. 11 illustrates equivalent schematics for normal operation of the sensor illustrated in FIG. 8.

FIG. 11 provides equivalent schematics for normal operation of the sensor 610 when the particular fluid is absent. Numerals 1 to 4 indicate the four terminals 601-604 (FIG. 9), respectively. Rs is a distributed resistance of the swellable conductor 640. Rns is a distributed resistance of the subsidiary conductor 650. Rc is a distributed resistance of the first conductor 620.

Figure 12:
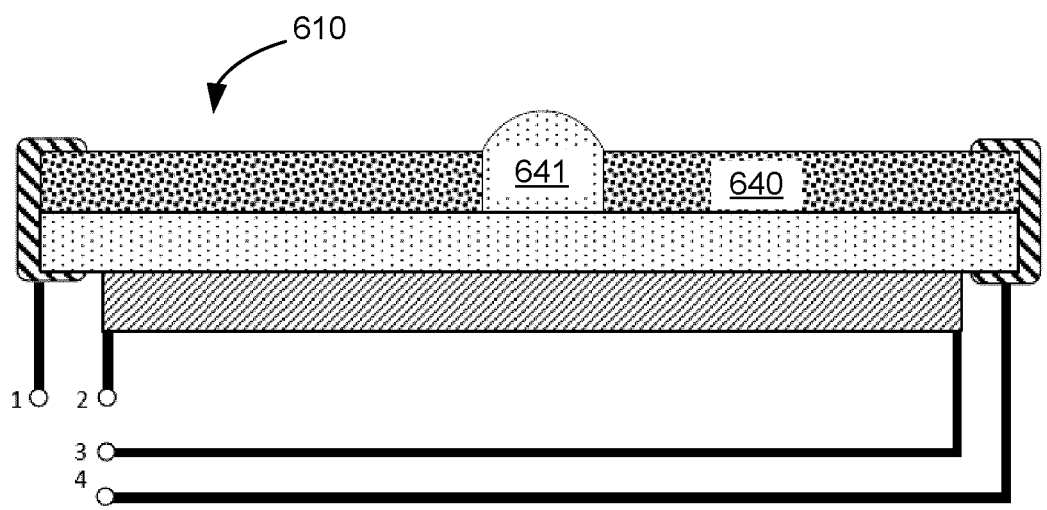
FIGS. 12 through 15A illustrate abnormal operation of the sensor illustrated in FIG. 8.
Figure 13:
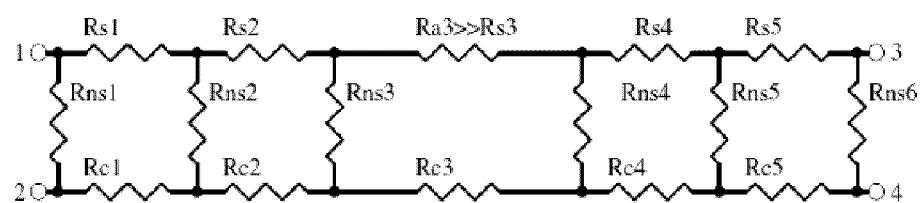
Figure 14:
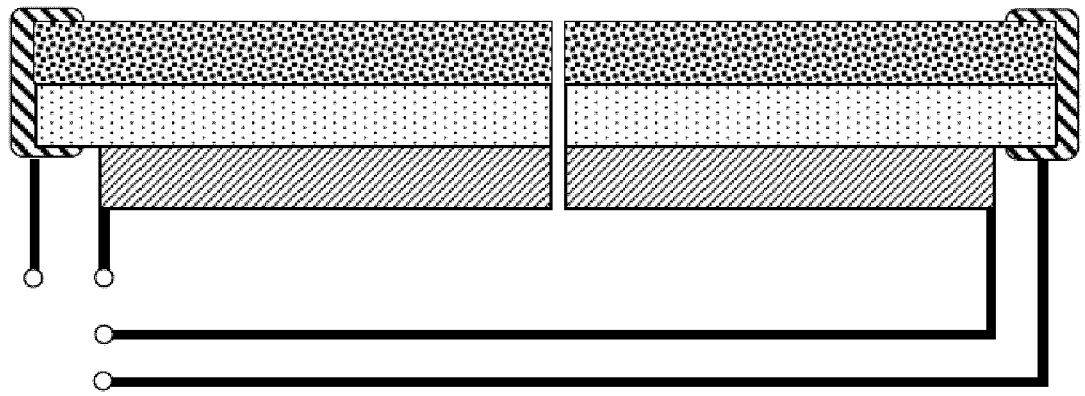
Figure 15:
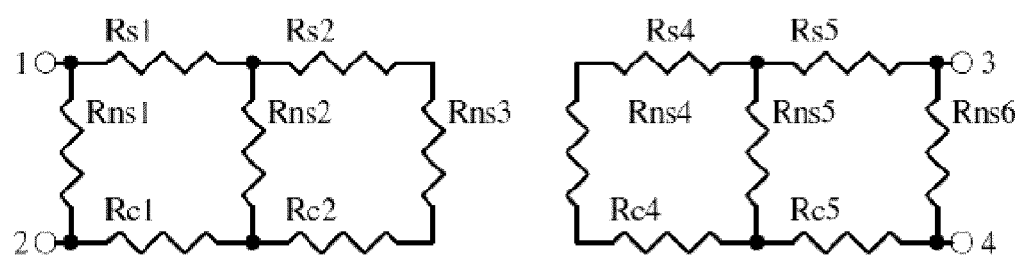

FIGS. 12 and 13 relate to the presence of a leakage caused by contact with the fluid targeted by the sensor somewhere in the central portion of the sensor. A portion 641 of the swellable conductor 640 is swollen because it has been infiltrated with the fluid. The schematics in FIG. 13 shows an increased resistance in the swollen portion. FIGS. 14 and 15 relate to a physical break in the sensor. Numerals 1 to 4 indicate the four terminals 601-604 (FIG. 9), respectively.

Figure 15A:
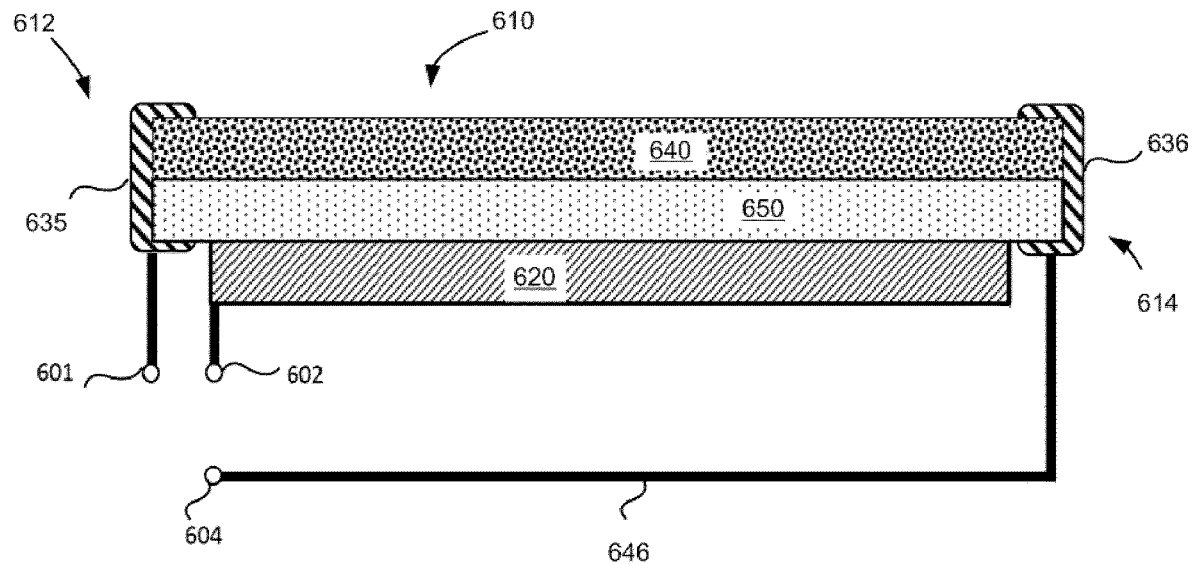

Providing electrical power to the sensor and measuring the resistance between the ends 1 and 3, 1 and 2, 1 and 4, 2 and 3, 2 and 4, one can identify the presence and location of a leakage or break. The resistance of the conductor 620 being very low compared to the resistance of 640 and 650, there would be no need for additional measures as 1 to 3 will give substantially the same result as 1 to 2. However, measuring 4 to 2 (or 4 to 3) can be used for better precision in the location determination. A simplified measuring procedure for determining the location of the leak is illustrated in FIG. 15A.

Compared to the conductance of the swellable conductor 640, the conductance of the substantially non-swellable subsidiary conductor 650 is lower by several magnitudes, creating a weak parallel connection between the first conductor 620 and the swellable conductor 640. The first conductor 620 exhibits high conductance, preferably at least 10 times higher than that of the subsidiary conductor 650. The combination of the first conductor 620 having a high conductance and the substantially non-swellable subsidiary conductor 650 having a low conductance creates a hybrid non-swellable conductor, with electrical resistance of a constant and known value. Measuring the electrical resistance in the sensor 610 between terminals 601 and 604 is equivalent to connecting a measuring device to the terminals of the sensor 10 (FIG. 1); and discriminating between leaks and breaks is achieved the same way.

The hybrid non-swellable conductor 620&650 allows additional features by incorporating terminals 602 and 604. In particular, the length of the sensor can be determined by measuring the electrical resistance between the terminals 602 and 603. Since the conductance of first conductor 620 is much higher than that of the second conductor 640&650 the resistance between the terminals 602 and 603 will not be affected by the status (alarm or normal) of the swellable layer 640.

The local expanding of the swellable conductor creates a discontinuity in the distributed resistances network and can be advantageously used to locate a leakage along the sensor by measuring the electrical resistance between the terminals 601 and 603, between 601 and 602, and/or between 603 and 604. In case of physical damage to the sensor, the location of a break can be determined by measuring the electrical resistance between the terminals 601 and 602, and/or between 603 and 604. The locations may be determined based on the Ohm Law using techniques known for resistor networks, or the sensor may be experimentally calibrated.

The aforedescribed sensors may be used in conditions where sensor may enter in contact with conductive media or non-target conductive fluids are naturally present, so nuisance alarms may be generated. Then the sensor needs a non-conductive coating permeable for the target fluid such as the jackets 160, 260, 360, 660A, 760, and that coating should provide electrical isolation between the sensor and the external solid particles or fluids. The isolative jacket may be swellable and/or elastic in order to allow the expansion of the swellable conductor underneath. Preferably, the elastic non-conductive overcoat is permeable for the target liquid but impervious to the water and other fluids that shall not be detected. In one embodiment, the non-conductive coating is made from the same swellable material as the one used for the manufacturing of the swellable conductors, such as conductors 140, 240, 340, 540, 640, 740, and through the same manufacturing operation such as over-molding, extrusion/coextrusion, etc., but without adding conductive particles, or by using low concentration of conductive particles that do not create conductivity in the base material.

In one embodiment, the electrical connection between the swellable layer and the first conductor is made through openings in the insulation of the central conductor that are filled during the manufacturing process with a swellable material, and this creates regular "bridges" for the electrical current and thus the same features as with a non-swellable layer are obtained.

Figure 16:
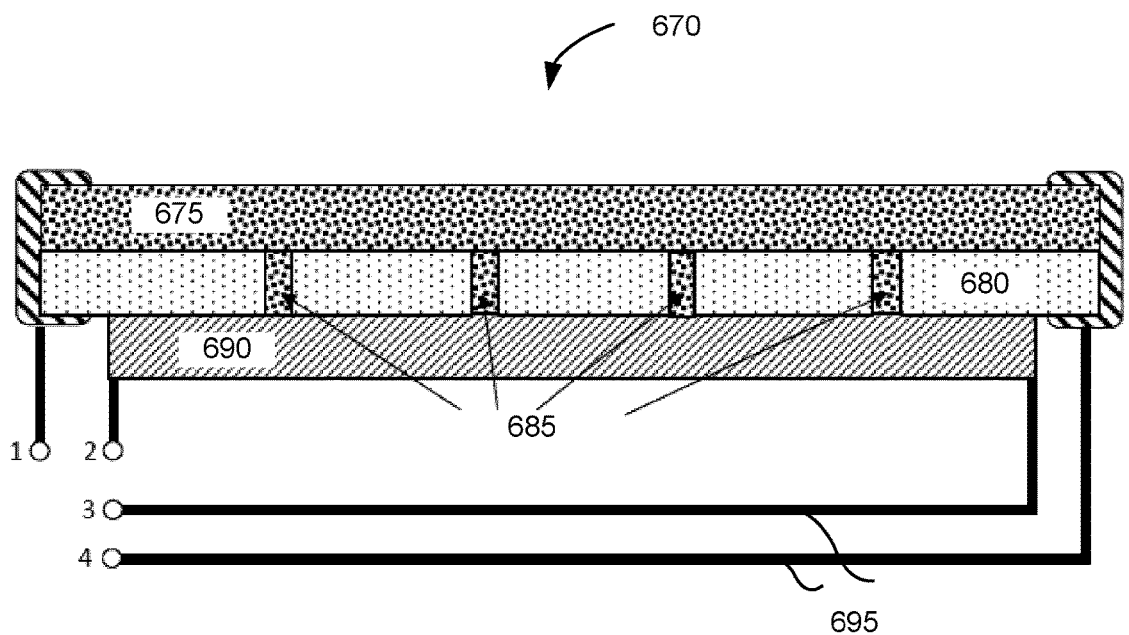
FIG. 16 is a schematic representation of an elongated sensor cable.

With reference to FIG. 16, a sensor 670 includes a swellable conductor 675; suitable materials are the same as for the swellable conductor 540 (FIG. 8). Adjacent to the swellable conductor 675 is an insulative layer 680 formed of an electric isolator and having gaps 685 filled with the swellable material thus connecting the swellable conductor 675 with the first conductor 690 which may be made of the same materials as the first conductor 520. The sensor 670 optionally includes additional conductors 695 and a protective coating (not shown).

Figure 16A:
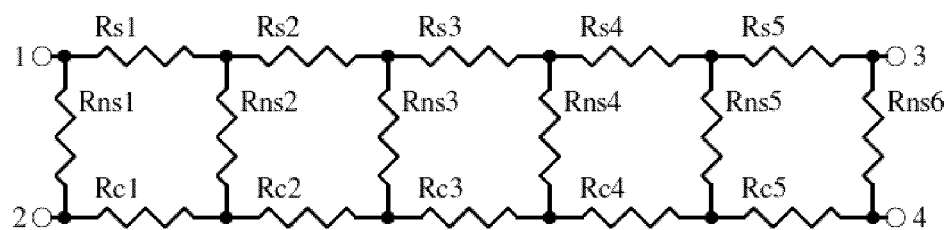
FIG. 16A illustrates equivalent schematics for normal operation of the sensor cable illustrated in FIG. 16.

FIG. 16A illustrates equivalent schematics for the sensor 670, wherein Rs—distributed resistance of swelling layer, Rns—resistances created by local contact between swellable layer and central conductor, and Rc—distributed resistance of central conductor.

Figure 17:
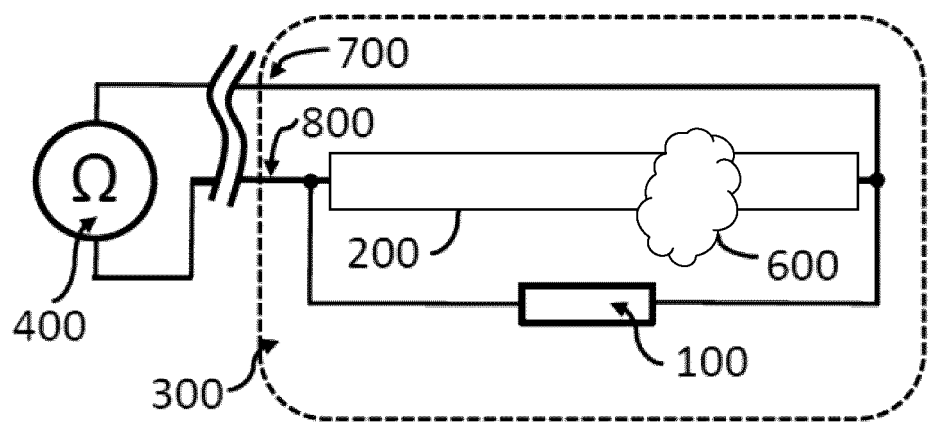
FIG. 17 provides electrical schematics of a detector including an elongated sensor.
Figure 18:
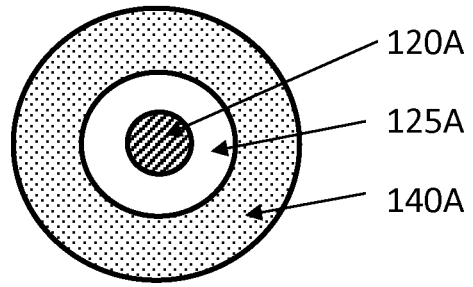
FIGS. 18 and 19 are schematic representations of embodiments of the sensor 200.
Figure 19:
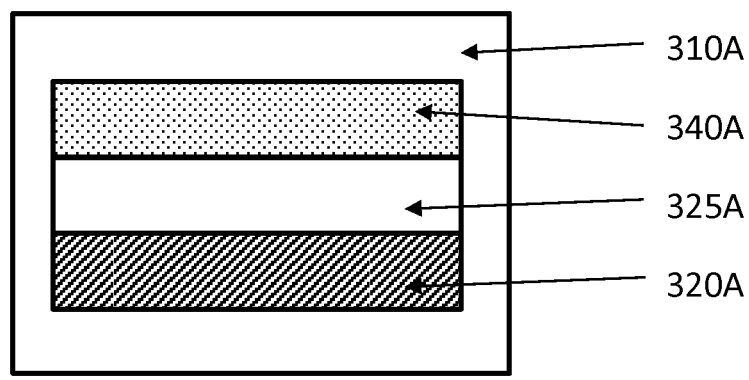

FIG. 17 provides electrical schematics of an elongated sensor cable 300 for detection of non-conductive liquids or vapors. The sensor cable 300 includes an elongated combination sensor with a swellable element 200, and a resistor 100. The elongated combination sensor has a proximal end and a distal end, and an inner portion therebetween. The combination sensor includes a first conductor extending from the proximal end to the distal end of the sensor and an elongated swellable conductor 200 extending from the proximal end to the distal end of the sensor, isolated from the first conductor in the inner portion of the sensor. At least a portion of the swellable conductor 200 is swollen when the portion is in contact with the fluid, and a conductance of the portion is at least 10 times less when the portion is in contact with the fluid than when absent contact with the fluid. With reference to FIG. 18, the combination sensor may include a first conductor 120A, an isolator 125A, a swellable conductive jacket 140A, which is an embodiment of the swellable conductor 200, and an optional elastic or swellable non-conductive jacket (not shown). The conductor 120A, isolator 125A, and swellable conductive jacket 140A have the same properties as the conductor 120, isolator 125, and the swellable conductive jacket 140 (FIG. 2), respectively. With reference to FIG. 19, the combination sensor may include a first conductor 320A, an isolator 325A, a swellable conductive jacket 340A, which is an embodiment of the swellable conductor 200, and a protective elastic or swellable jacket 310A; the elements have the same properties as the conductor 320, isolator 325, the swellable jacket 340, and the coating 360 (FIG. 6), respectively. The first conductor shown as conductor 120A (FIG. 18) or conductor 320A (FIG. 19) is an isolated conductor; it may be isolated with an isolating jacket, such as the jacket 125 or 325. The first conductor is an integral part of the combination sensor. The integral isolated conductor is a conductor that cannot be easily detached from the combination sensor. In case of mechanical damage of the elongated combination sensor, this conductor will be damaged as well, which allows to discriminate leaks from breaks. The inclusion of the resistor in parallel to the swellable conductor ensures that the conductance of the combination sensor is not completely lost when the swellable conductor is swollen when in contact with the target fluid. When the combination sensor is cut or broken, the connection to the termination resistor is lost as well and the total conductance is zero.

A passive termination resistor 100 with a resistance value of Rtm is connected locally in parallel to the swellable conductor 200 also referred herein as a sensor element 200. A termination resistor 100 is electrically connected to both ends of the swellable elongated sensor 200; to one end—through the first conductor which is an electrically isolated conductor mechanically integral with the sensor. The elongated sensor element 200 has a resistance value of Rs. The sensor 200 and resistor 100 form a composite resistor with an equivalent total resistance Rtot=Rs II Rtm, or Rtot=(Rs× Rtm)/(Rs+Rtm). Two conductors 700 and 800 may be wired through an optional two-wire jumper cable to a measurement device 400 used to determine the presence of the non-conductive fluid. Alternatively, the conductor 700 and/or 800 can be embedded into the swellable sensor element 200. The device 400 may be a simple two-terminal ohmmeter or another suitable device.

In case of physical contact of the sensor element with non-conductive liquid or vapor 600, the sensor starts swelling, its resistance increases.

Let the nominal resistance of the sensor element 200 at normal status be Rsn and Rtm be the resistance of the termination resistor 100, so by measuring the equivalent resistance, the status of the sensor element 200 can be easily deducted from the following dependences:

Rmeas=Rsn II Rtm: Normal Status;
Rmeas<Rsn II Rtm: Short along the sensor element;
Rmeas>Rsn II Rtm and Rmeas<=Rtm: Presence of the fluid of interest on the sensor element;
Rmeas>Rtm: Break of sensor.

At the measurement side, a detection threshold can be defined for the leakage alarm, so nuisance alarms due to small contaminations can be avoided.

The resistance value of the terminal resistor 100 can be advantageously used to trim the sensitivity of the sensor element 200. As the total resistance determined by the measuring device is equivalent to the parallel connection of two resistances, a lower value for the termination resistor 100 will limit the total resistance increase in case of swelling of the sensor element 200 where the conductivity is not completely lost (the presence of vapor or viscous liquid from previous contamination). In case of a contact with the target liquid, the swelling of the sensor element 200 will be such that its conductance will be completely lost and the total resistance Rsn II Rtm will go beyond the detection threshold of the measurement device.

Another useful feature of the termination resistor 100 is that it can compensate for the nominal sensor element resistance deviation due to manufacturing, temperature effects, residual contamination after detection of heavy hydrocarbons, etc. It is extremely useful in case of retrofit or replacement of an existing sensor system where the new sensor may present a nominal resistance different from the nominal resistance of the old sensor and the alarm system with fixed threshold may go into a leakage alarm or an in integrity alarm in case of break/short. The total resistance can be easily adjusted using the termination resistor 100, which can be with fixed or adjustable resistance value. The terminal resistor 100 may also have other features, for instance a temperature coefficient with a different sign but same magnitude as that of the swelling conductive sensor element 200, so it can compensate for the total resistance seen from ohmmeter should the sensor element resistance experience temperature dependence. Other compensation features can be achieved with different kinds of termination resistors.

The termination resistor 100 can be of any suitable kind, discrete film or wire wound resistor, or a distributed resistor made of high-resistance alloy wire, extruded conductive ceramic or plastic elongated element, etc. The use of elongated elements 100 and 200 with constant resistivity allows an automatic match of the value Rtm of the termination resistor 100 to the corresponding nominal resistance Rsn of the sensor element 200, so the ratio Rtm to Rsn will remain the same with different lengths of sensor cable 300.

The termination resistor 100 may be formed of any suitable combination of resistors connected in series, in parallel or in a combined series/parallel connection.

The termination resistor 100 can be embedded into a removable/replaceable end terminator, for easy testing and adjustment of the resistance of the element 100. The end terminator may also include a series resistor and an optional switch for simulating leakage alarms without the application of fluids on the sensor cable.

The sensor cable may optionally contain other conductors for additional functions as power supply of measuring equipment, spare wires, combination of separate sensor elements for different target fluids, etc.

The value Rtm of the termination resistor 100 can be in the range of 0.000001 to 1,000,000 times the nominal resistance Rsn of the sensor element 200, with preferred a range of 0.00001 to 100,000.

Figure 17A:
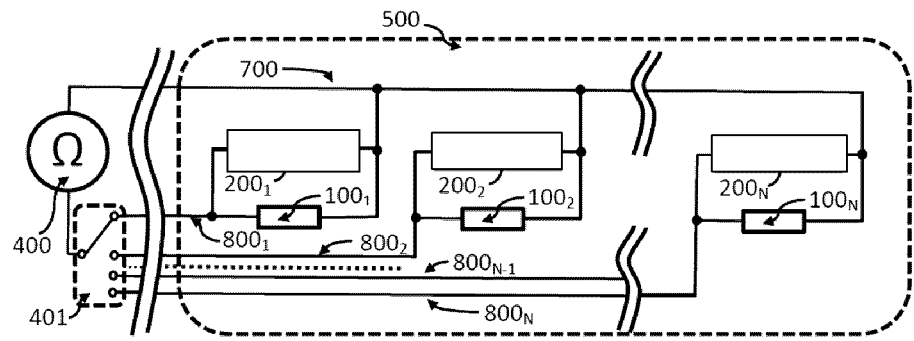
FIG. 17A illustrates electrical schematics of a multi-section sensor cable including elongated sensors.

The use of only two terminals for a sensor element allows simplified multiplexing along a sensor cable as shown in FIG. 17A. One of the terminals of each sensor is connected to a common reference, in some instances an available ground potential can be used.

FIG. 17A illustrates electrical schematics of a multiplexed multi-section sensor cable 500 for detection of non-conductive liquids or vapors. In the multi-section sensor cable 500, the conductor 700 serves as a common, reference conductor for all sectional sensors. Each sensor element 200 ($200_1$, $200_2$, . . . , $200_N$) may be an embodiment of the sensor 10 (FIG. 1), an embodiment illustrated in FIG. 18 or 19, or only the swellable conductor 40 (FIG. 1). It has a separate terminal resistor 100 ($100_1$, $100_2$, . . . , $100_N$) and electrical connection to the ohmmeter 400 through the common conductor 700, as first terminal, and a connection through an individual conductor 800 ($800_1$, $800_2$, . . . , $800_N$), as a selectable second terminal. The multiplexor 401 connects one by one the individual sensor sections to the ohmmeter 400. In other words, the sensor cable 500 includes a multiplexer 401, a shared conductor 700, and a plurality of sensor cables, each including a sensor 200 and a resistor 100 and having a first terminal and a second terminal, the first terminals are connected to the shared conductor 700, the second terminals each connected to an individual conductor 800, and the individual conductors 800 are multiplexed at the multiplexer 401. The sensor 500 may be used for detection of conductive fluids, if coated with a protective coating which acts as an electrical isolator.

Other multiplexing structures are possible, for instance using simple diodes very efficient matrix multiplexing can be built for an economic multi-sensor topology.

The sensor cables 300 and 500 contain only passive parts. They are durable and can withstand exposure to high-energy electric pulses without damage. The use of elongated sensors and sensor cables provide an efficient way for monitoring pipes, tanks, generators, etc., allowing for detection of leaking products from any point of the monitored equipment.

The aforedescribed sensors and sensor cables may be used as follows.

Large storage tanks may leak through corroded walls or tank bottom. Continuous monitoring based on leakage detection system is used in order to prevent large releases of hazardous fluids in the environment and loss of valuable product. One of the most frequently used detection systems is based on discriminating sensor cables that detect the physical presence of hydrocarbons or other target fluids while ignoring the water. Very often, during maintenance or normal operation, small quantities of hydrocarbons are released in the immediate vicinity of the tank and are absorbed by the soil. These residues are not considered as leaks but when they enter in contact with the sensors, a nuisance alarm may be generated and then the sensor has to be cleaned or replaced. The proposed sensors and sensor cables eliminate the frequent nuisance alarms by providing indication of the size of the contaminated sensor portion and straight-forward implementation of adjustable alarm threshold.

Leaking products from petrol stations may quickly contaminate the environment, damage the adjacent properties, and pose severe risk to the human life. Timely leakage detection of unwanted releases is an important part in the monitoring of such facilities. For instance, a leaking fuel dispenser may quickly cover a large area and constitutes a severe fire hazard. A leaking underground storage tank may contaminate the ground water and poison the soil of the neighboring properties. Reliable detection is an important part of the safe operation of petrol stations. During refueling, small quantities of liquid hydrocarbons are often released and may enter in contact with the sensors generating a nuisance alarm. These nuisance alarms will impact the normal operation of petrol stations. The proposed sensors and sensor cables eliminate the frequent nuisance alarms by providing indication of the size of the contaminated sensor portion. Insignificant quantities of products may be ignored while providing a warning about the contamination of the sensor.

It is practically impossible to supervise pipeline sections crossing water bodies by patrolling or aerial surveillance. Leaking pipelines release product that will float on the surface of the water and may quickly contaminate drinking water sources and wildlife habitat. Similar threats are found in harbors, marinas, etc. Hazardous fluid release in the water may pose a severe risk for the navigation, the human life and the environment. The water bodies may be contaminated by residual hydrocarbons from navigation, recreational activities, etc. A thin film of hydrocarbon is formed on the water surface and this film will trigger a nuisance alarm by the polymer-absorption sensor. The proposed novel sensors and sensor cables allow to set a minimum thickness of a hydrocarbon film which, if in contact with the hydrocarbons, that will trigger an alarm for a very reliable detection of large release of hazardous fluids.

A variety of liquid organic chemicals (e.g., oils, crude oil, refined petroleum products, gasoline, kerosene, organic solvents, and the like) are transported through buried pipelines. Leaks from these tanks and pipelines can contaminate ground water and cause extensive environmental damage. Further, leaks are difficult to detect and often are not detected until extensive environmental damage has already occurred. One method of detection has been to run a cable adjacent to the underground pipeline. However, very often and especially in urban environment, small quantities of hydrocarbons from other sources, such as vehicle leaks, motor or hydraulic oil pollution from pipeline maintenance, residual hydrocarbons from pipeline installing machines, etc., may enter in contact with the sensor cable and trigger a nuisance alarm leading to very costly excavation and leakage search. The proposed elongated sensors and sensor cables eliminate the false alarms by providing indication of the size of the contaminated sensor portion. Insignificant quantities of products may be ignored while providing a warning about the contamination of the sensor.

Figure 20:
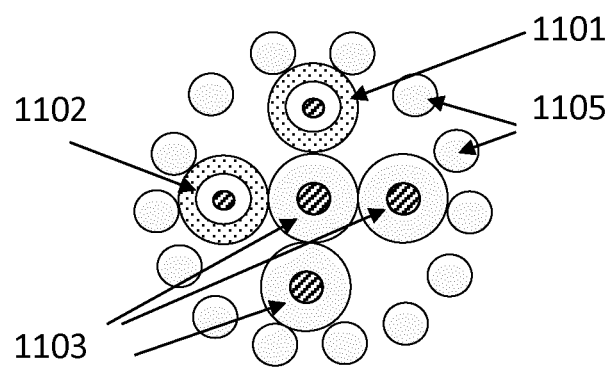
FIG. 20 is a cross section of a bundled sensor cable.

Advantageously, several elongated sensors or sensor cables, e.g. used for different fluids, may be used together. With reference to FIG. 20, a bundled sensor cable may include a first sensor 1101 for detection of a first group of fluids, a second sensor 1102 for detection of a second group of fluids, optional return conductors 1103, and a protective braid 1105 made of an insulating material permeable for the fluids of both groups.

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

The invention claimed is:

1. An elongated sensor having a proximal end and a distal end, and an inner portion therebetween, for detecting the presence of a fluid, the sensor comprising:
   a first conductor extending from the proximal end to the distal end of the sensor; and,
   a second conductor extending from the proximal end to the distal end of the sensor, isolated from the first conductor in the inner portion of the sensor, comprising:
      a swellable conductor, wherein at least a portion of the swellable conductor is swollen when the portion is in contact with the fluid, and wherein a conductance of the portion is at least 10 times less when the portion is in contact with the fluid than when absent contact with the fluid, and
      a subsidiary conductor in direct contact with the swellable conductor in the inner portion of the sensor and in electrical contact with the first conductor at the distal end of the sensor, the swellable conductor is at least 50% more swellable than the subsidiary conductor, and a ratio of the conductance of the subsidiary conductor to the conductance of the swellable conductor when absent contact with the fluid is in the range of 0.0000001 to 1000;
   wherein the first conductor is at least partially covered with an isolative jacket for electrically isolating the first conductor from the second conductor in the inner portion of the sensor.

2. An elongated sensor according to claim 1, in which the subsidiary conductor forms a subsidiary jacket at least partially covering the isolative jacket, and wherein the swellable conductor forms a swellable conductive jacket at least partially covering the subsidiary and isolative jackets.

3. An elongated sensor according to claim 2, in which the swellable conductive jacket is covered with an elastic or swellable insulative jacket permeable to the fluid but impervious to non-target fluids.

4. An elongated sensor having a proximal end and a distal end, and an inner portion therebetween, for detecting the presence of a target fluid, the sensor comprising:

a first conductor extending from the proximal end to the distal end of the sensor; and, a second conductor extending from the proximal end to the distal end of the sensor, isolated from the first conductor in the inner portion of the sensor, comprising:

a swellable conductor, wherein at least a portion of the swellable conductor is swollen due to absorption of the target fluid when the portion of the swellable conductor is in contact with the target fluid, and wherein a conductance of the portion of the swellable conductor is at least 10 times less when the portion of the swellable conductor is in contact with the target fluid than when absent contact with the target fluid, and a subsidiary conductor in direct contact with the swellable conductor in the inner portion of the sensor and in electrical contact with the first conductor at the distal end of the sensor.

5. An elongated sensor according to claim 4, in which the subsidiary conductor forms a subsidiary jacket at least partially covering the first conductor, and wherein the swellable conductor forms a swellable conductive jacket at least partially covering the subsidiary jacket.

6. An elongated sensor according to claim 5, further comprising a first return conductor coupled to the second conductor at the distal end of the sensor and extending to the proximal end of the sensor.

7. An elongated sensor according to claim 6, further comprising: a second return conductor coupled to the first conductor at the distal end of the sensor and extending to the proximal end of the sensor.

8. An elongated sensor according to claim 7, further comprising two connectors connected to the first and second return conductors at the proximal end of the sensor.

9. An elongated sensor according to claim 5, in which the swellable conductive jacket is covered with an elastic or swellable insulative jacket permeable to the fluid but impervious to non-target fluids.

10. An elongated sensor according to claim 4, in which the conductance of the subsidiary conductor is at least 10 times less than the conductance of the first conductor.

11. An elongated sensor according to claim 10, further comprising a first connector connected to the first conductor at the proximal end of the sensor and a second connector connected to the subsidiary conductor at the proximal end of the sensor.

12. An elongated sensor according to claim 11, in which the second connector is connected to the swellable conductor at the proximal end of the sensor.

13. An elongated sensor according to claim 4, in which the swellable conductor comprises a swellable material with conductive admixture dispersed therein, and wherein the swellable material comprises a natural or synthetic rubber, silicone, a thermoplastic elastomer, a styrenic polymer or elastomer, a vinyl polymer, or a vinyl elastomer.

14. An elongated sensor according to claim 4, in which the subsidiary conductor comprises a base material with conductive admixture dispersed therein, an intrinsically conducting polymer, carbon fibers, or an insulated elongate element covered with a film of conductive particles.

15. A sensor cable for detecting the presence of a target fluid, comprising:

an elongated sensor having a proximal end and a distal end, and an inner portion therebetween, the sensor comprising: a first conductor extending from the proximal end to the distal end of the sensor and an elongated swellable conductor extending from the proximal end to the distal end of the sensor, isolated from the first conductor in the inner portion of the sensor, wherein at least a portion of the swellable conductor is swollen when the portion is in contact with and absorbs the target fluid, and wherein a conductance of the portion is at least 10 times less when the portion is in contact with the target fluid than when absent contact with the target fluid;

and a termination resistor connected in parallel to the swellable conductor of the elongated sensor through the first conductor of the elongated sensor.

16. A sensor cable according to claim 15, wherein the elongated swellable conductor is covered with an elastic or swellable insulative jacket permeable to the fluid but impervious to non-target fluids.

17. A sensor cable comprising a multiplexer, a shared conductor, and a plurality of sensor cables according to claim 15, in which each of the plurality of sensor cables has a first terminal and a second terminal, the first terminals are connected to the shared conductor, the second terminals each connected to an individual conductor, and the individual conductors are multiplexed at the multiplexer.

* * * * *